United States Patent

[11] 3,573,488

[72] Inventor Howard R. Beelitz
 Princeton, N.J.
[21] Appl. No. 665,344
[22] Filed Sept. 5, 1967
[45] Patented Apr. 6, 1971
[73] Assignee RCA Corporation

[54] ELECTRICAL SYSTEM AND LSI STANDARD CELLS
 11 Claims, 10 Drawing Figs.
[52] U.S. Cl. .................................................. 307/207,
 307/203, 307/215, 307/289
[51] Int. Cl. .................................................. H03k 19/08
[50] Field of Search .................................. 307/203–
 —218, (Literature), 213, 215, 289; 317/235.22

[56] References Cited
 UNITED STATES PATENTS
 3,259,761 5/1966 Narud ........................ 307/215
 3,365,707 1/1968 Mayhew ..................... 317/235
 3,446,990 5/1969 Goldberg .................... 307/215

OTHER REFERENCES
Pressman, Design of Transistorized Circuits for Digital Computers, p. 274, FIG. 10— 12A. March, 1959.

*Primary Examiner*—Donald D. Forrer
*Assistant Examiner*—David M. Carter
*Attorney*—H. Christoffersen ABSTRACT: A large scale integrated (LSI) array of standard (i.e. unit) cells and systems implemented thereby is described. The standard cell includes a current mode switching transistor pair, a pair of fan-in expander transistors, a further transistor useful either as an output emitter-follower or as another fan-in transistor and a $V_{ref}$ deriving circuit which includes some resistors and another pair of transistors. Both committed and uncommitted connecting points are provided for the cell whereby the system designer is given the flexibility of specifying the functional identity of a cell, a group of cells, parts of a cell and various combinations thereof by means of a design connection pattern of the various uncommitted connecting points.

Patented April 6, 1971

LEGEND:

| A | B | C | Q | Q̄ |
|---|---|---|---|---|
| H | H | H | H | L |
| H | H | L | H | L |
| H | L | H | H | L |
| L | H | H | H | L |
| L | L | H | H | L |
| L | H | L | H | L |
| H | L | L | H | L |
| L | L | L | L | H |

INVENTOR
HOWARD R. BEELITZ

BY Robert R. Hubbard

ATTORNEY

INVENTOR
HOWARD R. BEELITZ

BY Robert R Hubbard
ATTORNEY

INVENTOR
ROBERT R. BEELITZ
BY Robert R Hubbard
ATTORNEY

INVENTOR
HOWARD R. BEELITZ

BY Robert R. Hubbard
ATTORNEY

ELECTRICAL SYSTEM AND LSI STANDARD CELLS

The invention herein described was made in the course of or under a contract or subcontract thereunder with the Department of the Air Force.

BACKGROUND OF INVENTION

The implementation of electronic apparatus at the system and/or subsystem level is undergoing radical change with the advent of large scale integration (LSI) technology in terms of performance, reliability and design practices. As used herein, LSI technology refers to the manufacturing capability of fabricating more and more circuit components in or on the same chip or substrate, whereby the electronic functional complexity on the chip approaches the system or subsystem level, as distinguished from more elemental functional units such as logic gates, amplifiers, and the like.

The application of LSI technology to digital systems, such as electronic computers promises to improve operating speed performance. Approximately 99 percent of the space even in densely packaged computers represents packaging and circuit interconnections. This separation between computer components results in a severe speed problem. Large scale integration of circuit components on a single substrate offers promise of alleviating this speed problem.

Electrical signals must cross a multiplicity of interfaces between computer elements, for example, bonded interconnections, soldered or welded connections, wire-wrap connections and plug-card connections. Due to the human factor involved in the manufacture of these connections, reliability is limited. The LSI technology offers batch fabrication of interconnections, thereby improving reliability.

The customary digital system design dichotomy of circuit or functional building block designers interfaced with system designers is being modified by LSI technology which introduces another interface—that of the batch fabricating manufacturer with both the building block and the system designers. The aim for an LSI computer equipment is to employ as few LSI packages as possible which are all preferably of the same type in order to minimize cost as well as differing parts. In achieving this aim, it is necessary to pack as much functional capability as practical into an LSI package. This requires an efficient utilization of LSI package space or area as to both component layout as well as interconnection thereof at the system level. Efficient usage of area and thus optimum functional capability of the LSI package can only be achieved by the joint cooperative working effort of the batch fabricating manufacturer, the building block designer and the system designer.

The most efficient use of LSI package area is achieved by the custom approach to LSI whereby each functional or system design is customized both as to component location and as to metallization interconnects. However, the custom approach requires the design and implementation of a new set of fabricating masks for each new function or system design. At the present time the cost of a new set of fabricating masks for each new chip design is prohibitive for low volume orders and is justified only for high volume orders.

Another approach to LSI is the master slice approach which distributes the cost of fabricating masks among different functional or system designs, except for the mask or masks involved in metallization (the final fabricating step). In other words, for a given chip component layout, the same master slice fabricating masks, such as diffusion and insulation masks, are used for every functional design, but different metallization masks are required for each new or different design. Thus, the component layout is fixed and only the metallization pattern is customized for each new application. The success of a master slice LSI array component layout depends upon whether an adequate number of different applications of sufficient functional complexity can be designed with a fixed component layout in order to satisfy the economics of distributed fabricating costs. Accordingly, it is important to provide a component layout which affords not only an efficient use of chip or substrate area but also a sufficient degree of design flexibility in order to assure an adequate number of different applications of sufficient functional complexity.

The master slice LSI approach generally involves the organization of the circuit components into an array of substantially identical component cells (standard cells) or building blocks which may have a fixed or variable functional identity. A fixed identity cell, for example, may be a NOR gate, whereby each new application is generated from interconnections of the gates in the array. This fixed identity cell array is unsatisfactory because it is limited in design flexibility as well as being inefficient in utilization of substrate area. The design flexibility is limited since only NOR gates can be used to implement the system functions. The fixed identity cell array also is inefficient because in many applications not all of the inputs to a logic gate are used, whereby the area occupied by unused NOR gate input components is wasted. In addition, the fixed identity cell array is inefficient in forming certain functions, such as flip-flops.

The variable identity cell, on the other hand, affords the systems or application designer the flexibility of specifying the functional identity of a cell, a group of cells, parts of a cell and various combinations thereof such that the functional complexity of the chip is greatly enhanced. However, it is extremely important to provide a standard cell which is not only efficient in terms of substrate area usage but also is suitable for implementing enough different applications of sufficient functional complexity in order to justify the costs.

The present invention relates to standard cells and circuits which are useful in bipolar LSI arrays. In particular, the standard cells and circuits are generally related to the nonsaturating current mode switch family. The usual type current mode switch includes at least two transistors having separate collector circuits and a common emitter circuit in which a current source is connected. The current source current can be routed through either one of the alternate current paths provided by the collector-to-emitter paths of the transistors by application of a suitable difference in potential between the base electrodes thereof. When this type of current mode switching circuit is utilized as a logic gate, the difference in potential is achieved by applying relatively high (HI) and relatively low (LO) binary signal voltage levels to one transistor base electrode and a reference voltage ($V_{ref}$) to the other transistor base electrode. A value intermediate the high and low signal levels is assigned the $V_{ref}$ voltage so that the potential difference between the two signal levels and $V_{ref}$ controls which of the transistors the current is routed through. This type of logic gate is sometimes called a current mode logic (CML) gate.

BRIEF SUMMARY OF INVENTION

According to the system aspects of the invention, an LSI chip having a single power supply voltage distributed to the circuits on the chip is provided. External circuitry is operable to provide to and to receive from the LSI chip signals having a relatively large valued signal At First, second and third circuit groups are provided on the chip. The first circuit group receives the large valued signals and converts them to a relatively smaller valued signal swing. The second group receives the smaller valued signals and produces other signals of the same valued signal swing. The third circuit group receives the other signals of smaller valued signal swing and converts them to signals of the relatively larger valued signal swing. The first, second and third groups each include at least a pair of resistive elements. In the first circuit group, shorting stubs are connected across portions of first ones of the resistive element pair; while in the third group, other shorting stubs are connected across the second ones of the resistive element pairs.

According to another system aspect of the invention, an electrical system is constructed of current mode switching pairs. At least one input emitter-follower transistor is provided for each current mode switching pair and is adapted for use as a fan-in to a first transistor of the pair. At least one output emitter-follower transistor is provided for each current mode switching pair. Connecting means increases the fan-in of selected ones of the current mode switching pair by connecting the emitters of selected ones of the output emitter-followers to the emitters of selected ones of the input emitter-followers, whereby the output emitter-followers so connected provide a dual function of an output transistor for one current mode switch and as an input transistor to another current mode switch. In addition, the output emitter-follower transistor can serve as a fan-in to the second transistor of the current mode switching pair in some circuit applications, such as flip-flops.

According to another aspect of the invention, the system aspects of the invention as well as other systems can be implemented in an LSI chip having an array of standard cells wherein the standard cell includes first and second transistors each having base, collector and emitter regions and suitable for use as a current mode switching pair. To this end, first and second committed connection points are each individually shared by the collector region of the first transistor and a first load resistor, and of a second transistor and a second load resistor, respectively. The other ends of the collector resistors share a third committed connection point. A fourth committed connection point is shared by the emitter regions of the two transistors and one end of an emitter resistor, the other end of which is connected to a fifth committed connection point. The collector region of a third transistor also shares the third committed connection point. A fourth transistor is also provided. Uncommitted connection points are associated with each of the committed connection points except for the fifth, with each of the base regions of all of the transistors and with the emitter region of the fourth transistor. The collector region of the fourth transistor may be associated either with a further uncommitted connection point or with the third committed connection point.

In preferred embodiments of the invention, fifth and sixth transistors are also provided along with fourth, fifth, sixth and seventh resistors and sixth and seventh committed connection points. The collector region of the fifth transistor is connected to the third committed connection point. The sixth transistor has one of its collector and emitter regions connected to the fifth point and the other of the collector and emitter regions connected to the sixth point. One end of each of the fourth and fifth resistors is also connected to the sixth point. The base region of the sixth transistor is connected to one of the fifth and sixth points. The seventh point is shared by the other end of the fifth resistor, one end of the sixth resistor and the base region of the second transistor. Further uncommitted connection points are associated with the other ends of the fourth and sixth resistors, both ends of the seventh resistor and the base and emitter regions of the fifth transistors.

According to a further aspect of the invention, a further pair of uncommitted connection points is provided. One of the pair of points is associated with an intermediate point of the third resistor and the other of the pair is associated with an intermediate point of the fifth resistor.

BRIEF DESCRIPTION OF THE DRAWINGS

In the drawings, like reference characters denote like components.

DETAILED DESCRIPTION

The standard cells and circuits of the present invention may be constructed with transistors of any desired conductivity type semiconductor material which is generally employed to make transistors in the semiconductor art. However, by way of example and completeness of description, the transistors employed in the standard cells and circuits are illustrated, for the most part, as NPN types. Also, in the description which follows, all semiconductor material will be assumed (for the purpose of example) to be silicon, unless otherwise specified.

With respect to the circuit embodiments of the present invention, they may be implemented either with discrete components or by means of integrated circuit processes. By way of example, the circuits are herein illustrated in the integrated circuit environment of an LSI chip.

According to present day bipolar integrated circuit technology, the circuit elements such as transistors, resistors capacitors, and the like, are formed by diffusion in or on a substrate. For the NPN transistor examples of the invention, the substrate may be P-type silicon. The NPN transistors may be formed by successive overlying diffusions of N-, P- and N-type silicon regions in a surface of the substrate; while resistors may be formed by successive overlying diffusions of N and P-type silicon regions. Different circuit elements may be electrically isolated by any suitable means such as a P+ type well. A suitable insulating layer, such as silane ($SiH_4$), overlies the diffused region surface and has access apertures therethrough to provide contact points to selected portions of the diffused regions. A multilayer interconnect metal structure may be supported on top of the insulating layers and may extend through the access apertures to interconnect the various diffused circuit element regions into desired functional circuit arrangements.

STANDARD CELL BUILDING BLOCK

Figure 1:
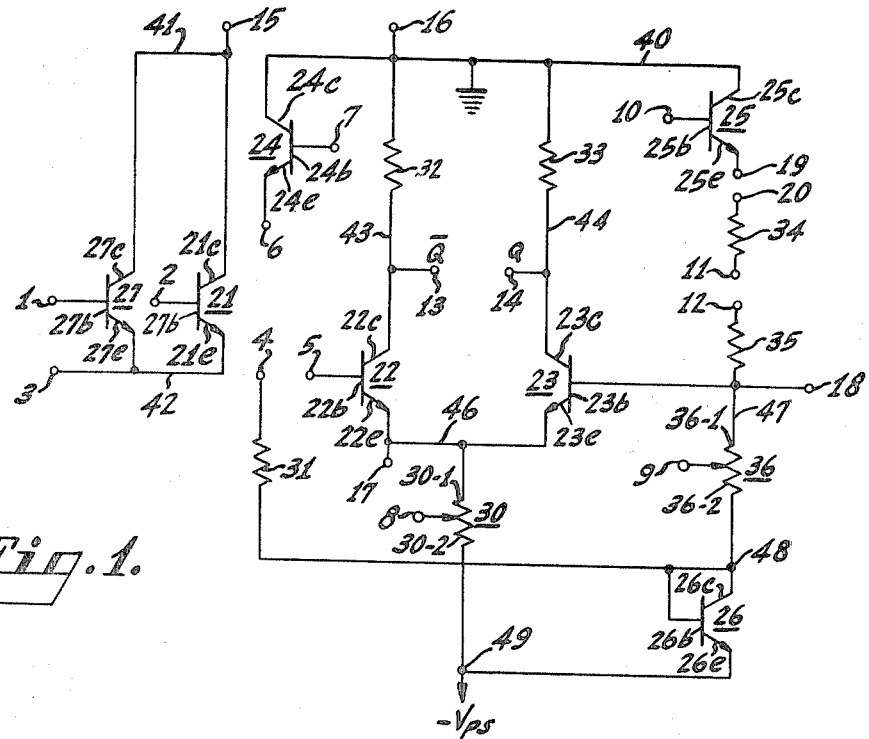
FIG. 1 is a schematic circuit diagram of the standard cell of the present invention illustrated with conventional electrical circuit symbols.

One embodiment of a standard or unit cell is illustrated FIG. 1 with conventional electrical circuit symbols in a schematic diagram. The standard cell includes seven NPN transistors, designated 21 through 27, and seven resistors, designated 30 through 36. Each of the transistors is a three electrode device having N-, P- and N-regions of material arranged to form collector, base and emitter regions. These regions are designated for the transistors 21 through 27 by means of the alphabetic character c, b or e following the numerical reference character for the associated transistor. For example, the transistor 21 has base and emitter regions 21c, 21b and 21e, respectively.

It should be noted at this point, that the cell diagram as illustrated, is for a single cell. When the cell is incorporated in an LSI array, various topological arrangements may be employed whereby one or more elements or parts (such as diffused regions) of elements may be common to two or more cells in order to conserve space or area on the chip. Two such topological arrangements are the dual (two) and the quad (four) cell configurations; i.e., the LSI array is made up of an array of dual or quad cell configurations. In such arrangements, for example, the common collector transistors in a dual or quad cell configuration may share a common or diffused collector region provided all collectors are intended to be returned to a fixed potential. That is, the common collector transistors of all the cells in a dual or quad configuration may be fabricated in a single isolation well, whereby these transistors share a common collector region. In addition, dual or quad cell configurations permit an entire element, such as a transistor, to be shared by the cells common to the dual or quad configuration.

The transistors and resistors in the FIG. 1 cell are partially interconnected via committed or unconditional connection paths; various uncommitted or conditional connection points also are provided. The various committed connection paths may be implemented by various connector means. For example, a connection path may be implemented by a diffused region of semiconductor material which forms a common region such as a collector for two transistors as described previously. On the other hand, the connection path may include metal connectors on either one or several layers of a multilayer metal interconnect structure. In addition, a series string of resistors (two or more resistors connected in series) may be implemented with a single diffused resistor region with tapping points disposed along the region to thereby form the connecting points to the individual resistors.

An unconditional or committed connection 40 generally serves as the ground reference as illustrated by the conventional symbol in FIG. 1. The committed connection 40 includes means for unconditionally connecting the collector regions 24c and 25c together. Similarly, a committed connection 41 unconditionally connects collector regions 27c and 21c together. The transistors 27 and 21 as well as the transistors 24 and 25 are generally used as common collector (emitter-follower) types, whereby the transistors 27 and 21 may be fabricated in the same isolation well, while the transistors 24 and 25 may be fabricated in another isolation well. In such case, the connection 41 and the transistor collectors 27c and 21c may be formed by a single diffused region; while the ground reference connection 40 may be partially formed along with the collectors 24c and 25c by another single diffused region. It should be noted at this point that in a dual or quad cell configuration, the common collector transistors 24 and 25 of all the cells in the dual or quad configuration may be located in the same isolation well and hence share a common diffused collector region. It should be further noted that the transistors 21 and 27 could be located in the same well as the transistors 24 and 25. However, in the preferred embodiment of FIG. 1, the transistors 27 and 21 are isolated from the transistors 24 and 25 in order to provide the system designer with the flexibility of connecting the committed connection 41 to points other than circuit ground.

The committed connection 40 also includes connector means connected to an end of each of the resistors 32 and 33. The resistors 32 and 33 may be formed either as separate diffused regions or as a single diffused region having an access aperture tap point with a metal contact to the committed connection 40. The other ends of the resistors 32 and 33 are unconditionally connected to the collector regions 22c and 23c by means of unconditional connectors 43 and 44, respectively. The emitter regions 27e and 21e are unconditionally connected together by the committed connector 42.

A further unconditional connection point 47 is shared by one end of each of the resistors 35 and 36 as well as the base region 23b. The other end of the resistor 36 and one end of a resistor 31 share an unconditional connection point 48 together with the base and collector regions 26b and 26c of transistor 26. The emitter region 26e and the other end of the resistor 30 share yet another unconditional connection 49. The unconditional connection 49 generally serves as a supply voltage connection and is adapted to receive a power supply voltage designated $-V_{PS}$ in FIG. 1.

The resistors 31, 36 and 35 comprise a series string such that they may be fabricated as a single diffused region with the committed connection points 47 and 48 being provided by access apertures at appropriate points on the diffused region.

As mentioned previously, a plurality of uncommitted or conditional contact points 1 through 20 are provided for the standard cell. The uncommitted points 1, 2, 5, 7, and 10 are associated with the base regions 27b, 21b, 22b, 24b, and 25b, respectively. The uncommitted points 3, 15, 16, 17 and 18 are associated with the committed connections 42, 41, 40, 46, and 47, respectively. The uncommitted contact points 6 and 19 are associated with the emitter regions 24e and 25e. The uncommitted contact points 4, 12, 11 and 20 are associated with the illustrated ends of the resistors 21, 35 and 34, respectively. The remaining uncommitted contact points 8 and 9 are associated with the resistors 30 and 36, respectively, and each serve as an intermediate tap on its associated resistor. Thus, the uncommitted contact point 8 serves to divide the resistor 30 into a portion 30–1 and a portion 30–2; while the uncommitted contact point 9 serves to divide the resistor 36 into portions 36–1 and 36–2.

It should be mentioned that for embodiments where transistors 21 and 27 are fabricated in the same isolation well as transistors 24 and 25, the collector regions 21c and 27c share the committed connection point 40 such that the uncommitted point 15 is not needed.

The standard cell in FIG. 1 is suitable for use as a variable identity building block in an LSI array to implement desired digital systems, such as adders, shift registers, counters and other logical switching systems. When implementing a desired system, the designer gives functional identity to the standard cell, a group of standard cells, parts of standard cells or any combination thereof by specifying the electrical or functional connections of the uncommitted contact points 1 through 20.

The FIG. 1 standard cell can be given various identities such as logic gates, driver gates, receiver gates, set-reset flip-flops, and so on. In the description which follows, several exemplary cell identities have been selected to illustrate some salient features of the present invention, namely, the concepts of "ripple fan-in" and "dual logic swing". In each of these examples, the resister 30 and the $-V_{PS}$ voltage source simulate a source of current for transistors 22 and 23 which are generally operable as a current mode switch. The transistors 21 and 27 generally serve an input transistors, while transistors 24 and 25 provide various functions depending on the assigned identity of the cell.

Also for these examples, a system design is selected In which the LSI chip may be required to cooperate with commercially available current mode logic integrated circuits, such as, for example, the ECCSL (emitter coupled current steering logic) CD 2150, CD 2151, CD 2152, RCA integrated circuit types, described in RCA Integrated Circuits Application Note, 1965, published by RCA Electronic Components and Devices, Harrison, New Jersey. The power source voltage $-V_{PS}$ is selected as $-V_{PS}=-4.2$ volts; the standard logic signal swing on the LSI chip is 600 millivolts for the LSI array; while the external ECCSL circuits may have a logic signal swing of 800 millivolts. In addition, the base-emitter junction voltage drop ($V_{BE}$) is considered to be 800 millivolts for all transistors.

ARRAY STANDARD LOGIC GATE

Figure 2:
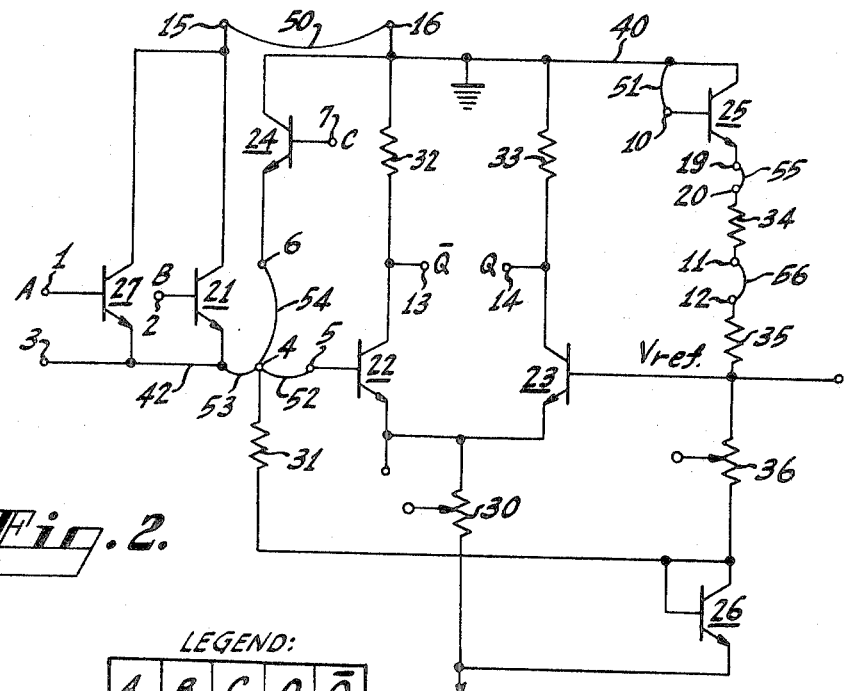
FIG. 2 is a schematic circuit diagram showing the standard cell of FIG. 1 connected as an array standard OR/NOR gate.

In FIG. 2, the unit cell is given the identity of a logic gate capable of performing the logic operations described by the accompanying legend. Thus, in FIG. 2 the connector 50 couples the uncommitted contact points 15 and 16 together; and the connector 51 connects the uncommitted contact point 10 to the committed connection 40. The connector 52 couples the uncommitted contact points 4 and 5 together; and the connector 53 couples the contact point 4 to the committed connection 42. Another connector 54 further couples the contact point 4 to the uncommitted contact point 6. A connector 55 couples the uncommitted contact points 19 and 20 together, while a further connector 56 couples the uncommitted contact points 11 and 12 together.

The input signals A, B and C are applied to the contact points 1, 2 and 7, respectively and output signals Q and $\bar{Q}$ are obtained from the contact points 14 and 13, respectively. The accompanying legend for FIG. 2 is descriptive for the circuit operation. Thus when either of input signals A, B or C is high (H), the output signal Q is high (H) and the output signal $\bar{Q}$ is low (L). On the other hand, when all of the input signals A, B and C are low, the output signal Q is low and the output signal $\bar{Q}$ is high. If the binary symbols 1 and 0 are assigned to the H and L levels, respectively, the logic circuit can be said to function as an OR gate with respect to the output signal Q and as a NOR gate with respect to the output signal $\bar{Q}$. On the other hand, if the binary symbols 1 and 0 are assigned to the L and H levels, respectively, the logic circuit functions as an AND gate with respect to the output signal Q and as a NAND gate with respect to the output signal $\bar{Q}$.

The FIG. 2 cell identity is designated as the Array Standard Logic gate since the signal swing or peak-to-peak voltage between the H and L levels is 600 millivolts, that is, the Array Standard Logic gate responds to 600 millivolts input signals to produce 600 millivolts output signals.

Briefly in terms of circuit operation, the transistors 25 and 26 are connected as diodes and in series with resistors 34, 35 and 36 to provide, by voltage divider action, the reference voltage $V_{ref}$ at the base of transistor 23 as well as providing temperature compensation and power supply tracking. The value of $V_{ref}$ is selected as intermediate the signal swing at the base of transistor 22 and preferably midway therebetween. The 600 millivolts signal swing for the signals A, B and C is between 0 volt and −600 millivolts. The input signals A, B and C are translated with level shift by the base-emitter junctions of the transistors 27, 21 or 24, as the case may be, to the base of the transistor 22. Thus, the signal swing at the base of transistor 22 is between −800 millivolts (one $V_{BE}$ below the bases of transistors 21, 27 or 24) and −1400 millivolts, whereby $V_{ref}$ preferably has a value of −1100 millivolts. Hence, whenever A, B or C is at 0 volt, the transistor 22 is turned on and the transistor 23 is turned off, the current source current is routed through resistor 32 and the collector-emitter path of transistor 22 whereby the $\bar{Q}$ output is at the low value of −600 millivolts. On the other hand, substantially no current flows through resistor 33 whereby the Q output signal is at substantially 0 volt.

When all of the input signals A, B and C are at the low level of −600 millivolts, the transistor 22 is turned off and the transistor 23 is turned on. For this condition, the current source current flows through resistor 33 and the collector-emitter path of transistor 23. The value of resistor 33 is selected such that the output signal Q has a value of −600 millivolts. Substantially no current flows through resistor 32 and the output signal $\bar{Q}$ has a value of substantially 0 volt.

In the FIG. 2 CML gate, the uncommitted contact point 3 is available for use as an expander input. That is, expander units (transistors 21 and 27) could be borrowed from other cells. Moreover, the point 3 may be driven directly from emitter-follower outputs of other CML gates as, for example, the $\bar{Q}_P$ output of standard driver gate illustrated in FIG. 3. In that event, the uncommitted point 6 (FIG. 3) would be wired to the uncommitted point 3 (FIG. 2) to provide a "Phantom OR" function.

It should be noted at this point that other arrangements are possible for the $V_{ref}$ divider arrangement in the standard cell. For example, when the LSI array is comprised of dual or quad configurations, the diode connected transistor 26 can be shared with its neighbor cell, for the dual configuration, or with its three neighbor cells, for the quad configuration.

In practice, however, two or more diode connected transistors may be paralleled in order to obtain the proper voltage drop at the increased current. However, since the paralleled transistors would be fabricated as common collector types in the same isolation well, a savings in chip area is still obtained.

According to another arrangement, the NPN transistor 26 could be replaced by a PNP transistor having its collector and base electrodes connected to the committed connection point 49 and its emitter electrode connected to the committed connection point 48. The PNP transistor, by way of example, may take the form in an integrated circuit of a so-called PNP substrate type transistor. One advantage of this arrangement is that one less junction is required, thereby resulting in a simpler topological configuration in a smaller area on the chip. Another advantage of the PNP arrangement is that one less connection (the PNP collector) is required since the PNP collector (the substrate) is already returned to $-V_{PS}$.

STANDARD ARRAY DRIVER GATE WITH PHANTOM-OR OUTPUT CAPABILITY

Figure 3:
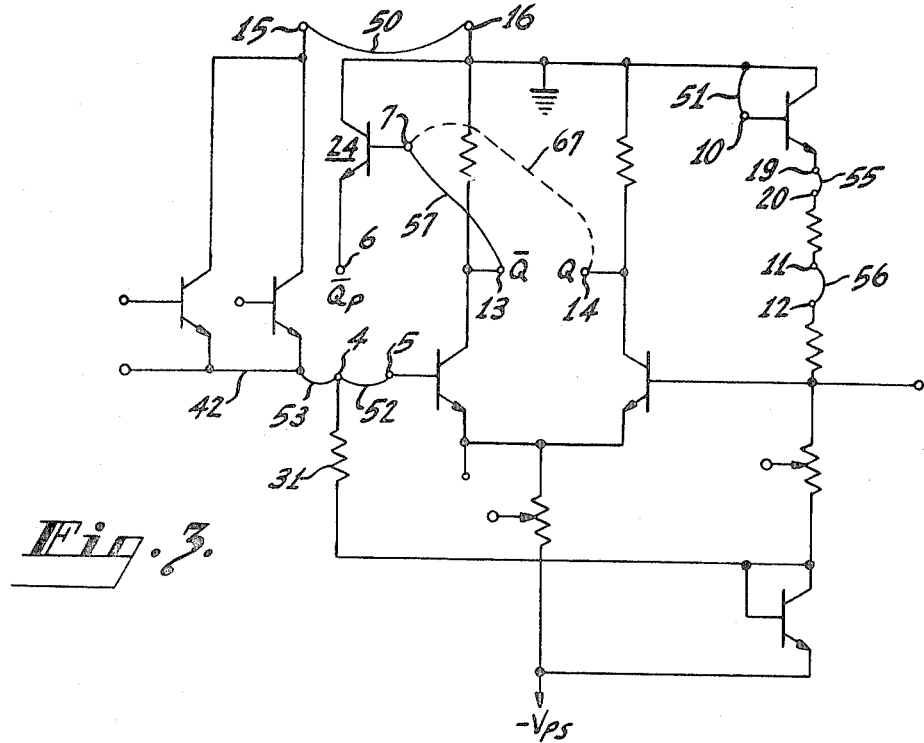
FIG. 3 is a schematic circuit diagram showing the standard cell of FIG. 1 connected as an array driver OR/NOR gate.

The Standard Array Driver Gate cell identity in FIG. 3 is similar to the standard CML gate cell of FIG. 2 except that transistor 24 is employed as an output transistor in order to provide phanton-OR capability as well as increased output current (and therefore increased fan-out). To this end, connectors 50, 51, 52, 143 55 and 56 are employed as in FIG. 2. However, connector 54 is not used. Instead a further connector 57 is used to connect the uncommitted contact points 13 and 7 together in order to obtain the $\bar{Q}_P$ output. Alternately, a further connection 67, shown dashed, can be used to connect the uncommitted points 14 and 7 together in order to obtain a $Q_P$ output. The $\bar{Q}$ output can be taken either from the contact point 13 or a OR output designated $\bar{Q}_P$ can be taken from the uncommitted contact point 6. That is, the contact point 6 can be phantom-ORed with the point 6 of other driver gate cells. The output point 6 of the driver gate cell can also be directly connected to expand the fan-in of a driven cell, as for example, to the contact point 3 of an Array Standard Gate cell.

FLIP-FLOP CELL

Figure 4:
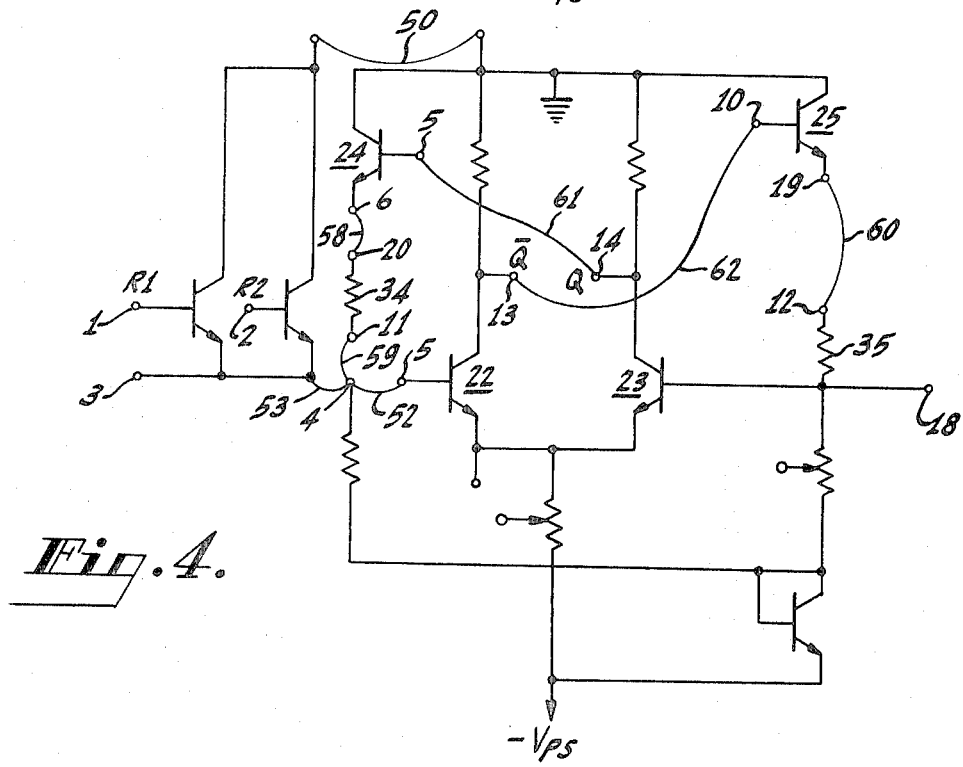
FIG. 4 is a schematic circuit diagram of the standard cell of FIG. 1 connected as a flip-flop cell.

The Flip-Flop identity cell is illustrated schematically in FIG. 4. Again the connectors 50, 52 and 53 are employed as in FIGS. 2 and 3. However, the other connectors illustrated in FIGS. 2 and 3 are not employed. Instead, connector 58 is employed to connect the uncommitted contacts 6 and 20; while connector 59 is employed to further connect the uncommitted contact point 4 to the uncommitted contact point 11. It should be noted at this point that the location of the resistor 34 and its associated contact points 11 and 20 is displaced from the location shown in FIGS. 2 and 3 merely for convenience in drawing the electrical circuit diagram. In the LSI array, the resistor 34 would, of course, have a fixed physical location. Another connector 60 connects the uncommitted contact points 12 and 19 together. The connector 61 connects the uncommitted contact points 7 and 14 together; while the connector 62 connects the uncommitted contact points 10 and 13 together.

In effect, the transistors 22 and 23 are cross-coupled to form a bistable pair. The transistors 24 and 25 serve as emitter-follower types in the cross-coupling loops. The output signals Q and $\bar{Q}$ are taken from the contact points 13 and 14, respectively. Reset input signals R1 and R2 are applied to contact points 1 and 2, respectively, whereby transistors 27 and 21 serve as reset inputs to the flip-flop. Additional reset inputs (derived from array driver gates, as mentioned previously) may be applied to the expander input at contact point 3.

The set inputs (not shown) to the flip-flop are provided by the emitter-follower output transistor or transistors 24 of array driver gates such as the one shown in FIG. 3. These set inputs are adapted for connection to the uncommitted contact point 18, which serves as a set expander input. The fan-in of the set and reset inputs is limited primarily by noise immunity considerations. That is, increased fan-in is obtained at the expense of decreased noise immunity.

It should be noted at this point that a set-reset (R–S) flip-flop cannot be implemented with only a single standard cell since the Flip-Flop cell, as illustrated in FIG. 4, has no standard set inputs. The Flip-Flop cell only assumes the complete function of an R-S flip-flop when properly driven. The R-S flip-flop comprises one standard cell plus the output transistors 24 from the driver gate cells, which may be physically located anywhere on the LSI chip. The identity of an R–S flip-flop is thus a function of the logic design of the entire LSI array.

In the logic design of an LSI array of FIG. 1 standard cells, the transistor 24 can simultaneously serve a dual function as (1) an output transistor for a driver gate and as (2) an input expander transistor for a driven gate or for a flip-flop cell. In the role of output transistor, the transistor 24 provides increased output current (and therefore increased fan-out) as well as providing a phantom-OR capability as described previously. As an input expander transistor, the transistor 24 shares either the resistor 31 or the resistor 36 of the driven cell, according to the associated contact point 3 or 18, as well as with any other transistors 24 which may be phantom-ORed to the particular expander input point.

The phantom-ORed capability allows for possible wiring simplification on the array chip. Each additional expander input does not have to be brought separately to the expander input points 3 or 18 as would be required in some conventional designs. For example, the set inputs to a flip-flop cell could be combined (phantom-ORed) anywhere on the chip with a single metal connector being routed to the set expander input 18. This technique of remote phantom-ORing should help to ease the wiring complexity (density) problem on the array chip.

In effect, the fan-in of a driven cell (either Standard Array Gate or Flip-Flop) is increased at the expense of available fan-in of the driver gate. However, since the driver gate, in turn, also has an expander input, it can regain or increase its fan-in at the expense of the gate or gates which is (or are) driving it. Thus, fan-in can be determined by rippling back from driven gate or driven Flip-Flop cells to Driver gates through the array until all fan-in requirements are satisfied. Accordingly, the worst case fan-in does not have to be physically built into each cell. The cell need only provide sufficient fan-in for the average requirement. Additional fan-in, where required, is obtained by this rippling or trading process from those circuits (cells) where lesser fan-in is required. This results in fewer components being required per cell, which is important because of the yield problem inherent in large scale integration. In summary then, the use of the standard cell to implement the Standard Array, Array Driver and Flip-Flop cells of FIGS. 2, 3 and 4 permits a high degree of logic flexibility (not specifying fan-in) while retaining efficiency of component utilization (no unused fan-in transistors).

Many other cell identities which use the "ripple-fan-in" concept are possible. Some further examples, are the Combined Array Receiver/Driver and the Mixed Receiver Gate.

COMBINED ARRAY RECEIVER/DRIVER

Figure 5:
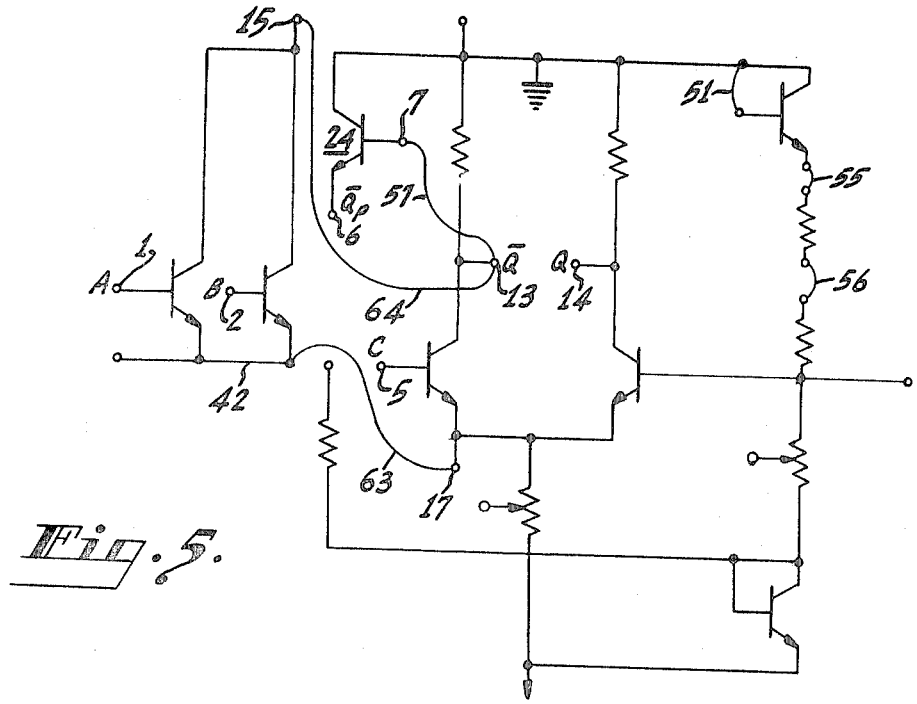
FIG. 5 is a schematic circuit diagram of the standard cell of FIG. 1 connected as a combined array receiver array driver.

The Combined Array Receiver/Driver cell identity is illustrated in FIG. 5. The connectors 51, 55, 56 and 57 are employed in the same manner as in the FIG. 3 array driver. In place of the connectors 52 and 53, a connector 64 couples the committed connection 42 to the uncommitted connecting point 17. Another connector 64 connects the uncommitted contacts 13 and 15 together. Input signals A, B and C are applied to the uncommitted contact points 1, 2 and 5, respectively; and the output signals $\bar{Q}_P$, $\bar{Q}$ and Q are taken from the contact points 6, 13 and 14, respectively.

The output signal levels for Q and $\bar{Q}$ are between 0 volt and −600 millivolts; while the signal levels for the input signal levels A, B and C are between −800 millivolts and −1400 millivolts, that is, these input signal levels are one $V_{BE}$ below the Q and $\bar{Q}$ output levels. The $\bar{Q}_P$ signal levels are also one $V_{BE}$ below the Q and $\bar{Q}$ levels or −800 and −1400 millivolts. Consequently, the Combined Array Receiver/Driver cell can only be driven from a $\bar{Q}_P$ output derived from either another Combined Array Receiver/Driver Gate or from an Array Driver Gate of the type illustrated in FIG. 3.

MIXED RECEIVER GATE

Figure 6:
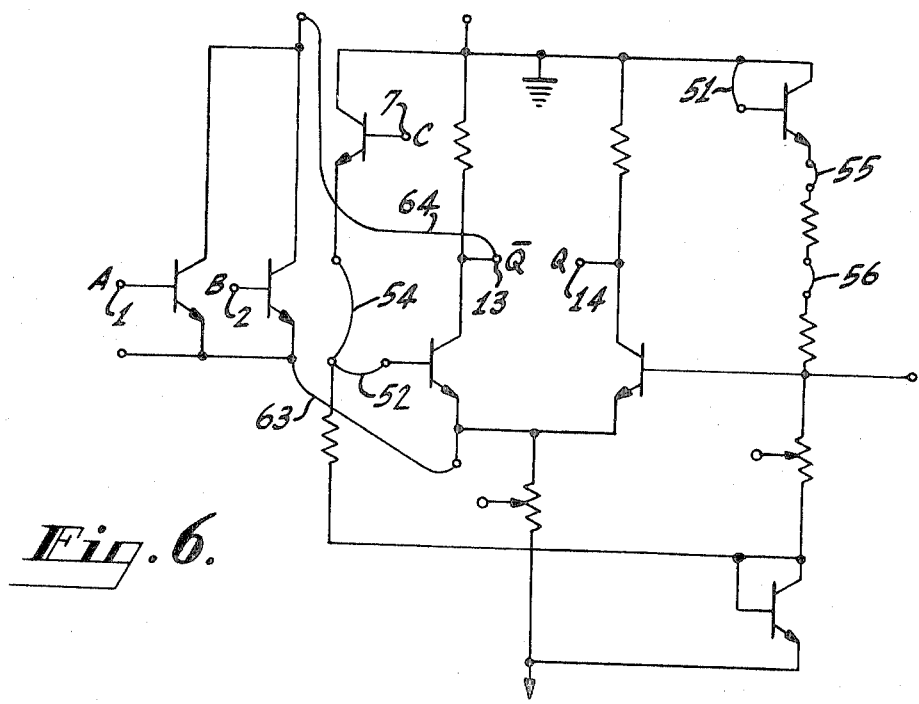
FIG. 6 is a schematic circuit diagram of the standard cell of FIG. 1 connected as a mixed receiver gate from the array unit cell.

The Mixed Receiver Gate cell identity is illustrated in FIG. 6. The Mixed Receiver Gate employs the connections 51, 52, 54, 55, 56, 63 and 64 in the same manner as these connectors have been employed previously. Input signals A, B and C are applied to the contact points 1, 2 and 7 respectively; while output signals $\bar{Q}$ and Q are taken from the contact points 13 and 14, respectively.

Like the Combined Array Receiver/Driver gate in FIG. 5, the signal levels of the A and B input signals must be at the depressed levels of −800 and −1400 millivolts. That is, they must be driven from an Array Driver such as the one in FIG. 2 or in FIG. 5. On the other hand, the signal levels of the input signal C are at the standard array signal levels of 0 and −600 millivolts whereby the C signal may be driven from the outputs Q or $\bar{Q}$ of any of the previously described cell identity examples.

DUAL LOGIC SIGNAL SWING CONCEPT AND INTERFACE CIRCUITS

The dual logic signal swing concept essentially is the use of a smaller signal swing (600 millivolts in the assumed system design) on the LSI chip as compared to the use of a larger signal swing (800 millivolts) by circuitry external to the chip. Operating the array circuits at as low a level as permitted by array tolerance, noise and other factors is highly desirable in order to conserve array power and current. For instance, with the array unit cell of the present invention operated at −5.2 volts power supply voltage and developing 800 millivolts logic signal swing, the available power dissipation is 50 milliwatts. With the circuit operated at −4.2 volts power supply and developing a 600 millivolts logic signal swing, the available power dissipation is reduced to just under 30 milliwatts. This represents a 40 percent reduction in power dissipation without sacrifice in performance. The reduction in logic signal swing is possible within the array due to the close tracking and matching of components that is normally obtained throughout the array due to simultaneous processing. In addition, the low noise level within the array should allow closer noise margins.

However, between arrays of LSI chips, the situation is different. Since the separate chips, in all probability, have not been fabricated simultaneously on a single silicon wafer, there is little likelihood of close matching or tracking in the array of components. In addition, the noise environment is more severe, therefore requiring larger noise margins. Consequently, higher logic signal swings are required between chips than are required within a chip.

According to the invention, there are provided interface driver and interface receiver circuits which may be readily implemented from the standard cell of FIG. 1. These circuits are implemented with the simple metallization of a shorting stub across a portion of the emitter-resistor 30 for the case of the interface driver circuit and across the resistor 36 for the case of the interface receiver circuit.

INTERFACE DRIVER GATE

Figure 7:
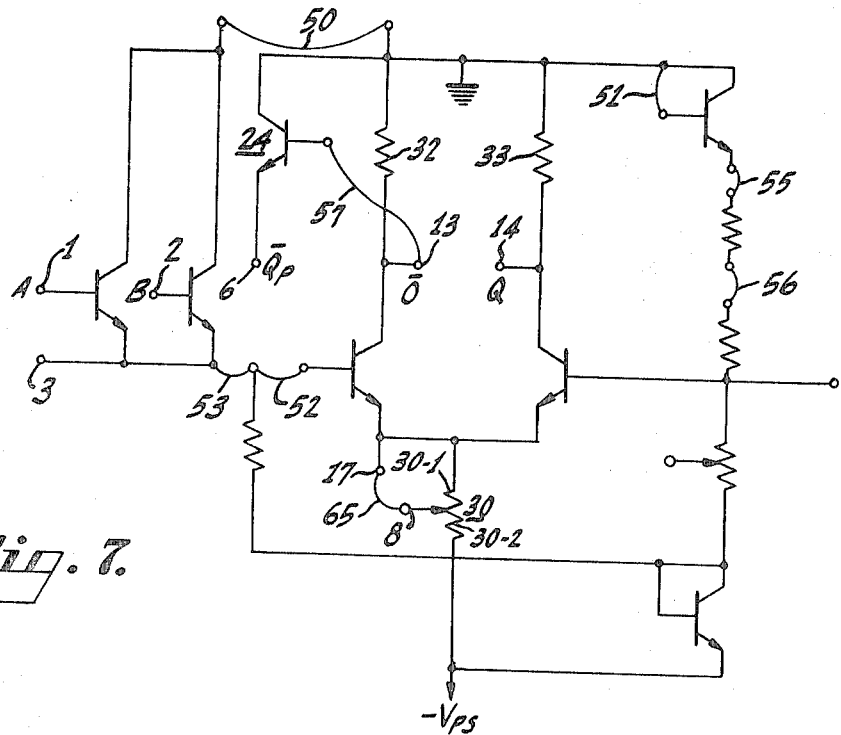
FIG. 7 is a schematic circuit diagram of the standard cell of FIG. 1 connected as an interface driver from the array unit cell.

The Interface Driver Gate cell identity is illustrated in FIG. 7. The connectors 50, 51, 52, 55, 56 and 57 are employed in the same manner as in FIGS. 2 through 6. Another connector 65 is employed to connect the uncommitted contact points 8 and 17 together. In essence, the connector 65 is a shorting stub connected across the portion 30-1 of emitter-resistor 30 whereby the resistance of resistor 30 is reduced to the value of the portion 30-2. Thus, the current source current (resistor portion 30-2 and voltage source $-V_{PS}$) becomes larger resulting in larger voltage drops across the collector-resistors 32 and 33. The value of the resistor portion 30-2 is selected so that the voltage drop across the resistor 32 or 33, as the case may be, is equal to 800 millivolts.

The input signals A and B are applied to the uncommitted contact points 1 and 2, respectively; while the uncommitted contact point 3 is available as an expander to increase the fan-in. The signals A and B have a logic swing of 600 millivolts and may be derived from the Q or $\bar{Q}$ outputs of any of the previously described cells. The output signals $\bar{Q}_P$, $\bar{Q}$ and Q are taken from the contact points 6, 13 and 14, respectively. These output signals each have substantially a logic swing of 800 millivolts due to the increased value of the current source current and are used to drive the external circuits in the system example. The $\bar{Q}_P$ output can be phantom-ORed with other interface driver gates since an internal emitter-follower resistor is not provided for the transistor 24. The increased logic power (phantom-OR capability) of the interface driver gate results in fewer gates and output pins being required.

ARRAY RECEIVER INTERFACE DRIVER GATE

Figure 8:
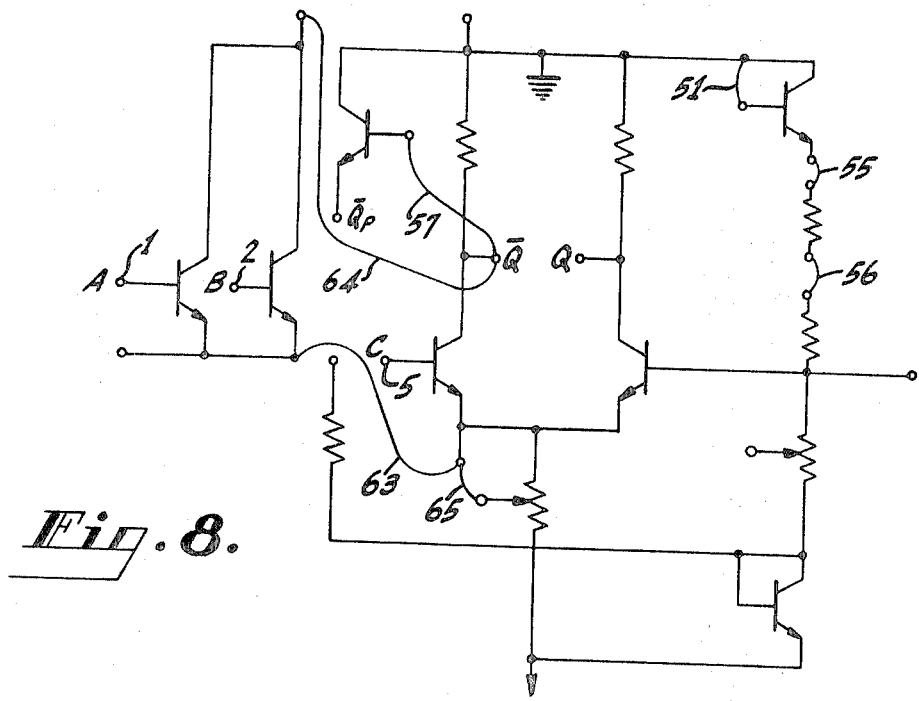
FIG. 8 is a schematic circuit diagram of the standard cell of FIG. 1 connected as an array receiver interface driver gate.

The Array Receiver Interface Driver Gate cell illustrated in FIG. 8 is similar to the Interface Driver cell of FIG. 7 except that its input signals A, B and C (contact points 1, 2 and 5, respectively) can be derived only from either a $\bar{Q}_P$ output or $Q_P$ output of any of the previously described cell identities. Again the connectors 51, 55, 56, 57, 63, 64 and 65 are employed in the same manner as each has been employed in the previously described cell identities.

Like the Interface Driver Cell (FIG. 7) the shorting stub 65 increases the current switch current so that the output signal swing for Q, $\bar{Q}$ and $\bar{Q}_P$ is substantially 800 millivolts. Also the $\bar{Q}_P$ (or $Q_P$) output can be phantom-ORed.

COMBINED INTERFACE RECEIVER ARRAY DRIVER

Figure 9:
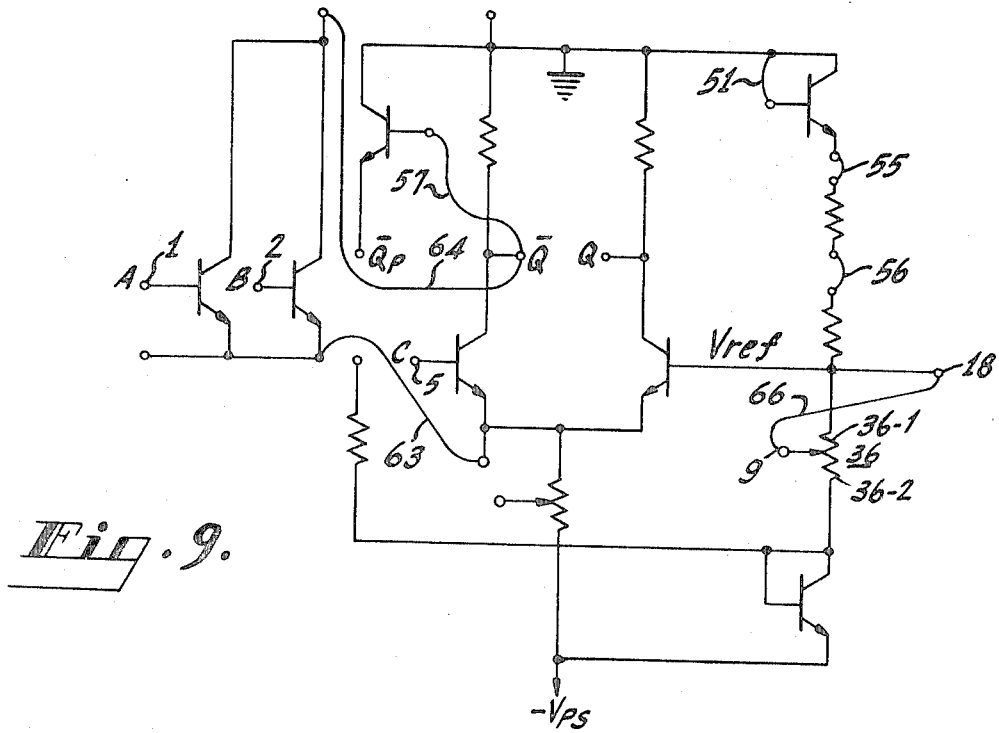
FIG. 9 is a schematic circuit diagram of the standard cell of FIG. 1 connected as a combined interface receiver and array driver gate.

The Combined Interface Receiver and Array Driver Gate cell is illustrated in FIG. 9. The connectors 51, 55, 56, 57, 63 and 64 are employed in the same manner as in the previously described cell identities. A connector 66 couples the uncommitted contact points 9 and 18 together to thereby short-out the portion 36–1 or resistor 36. The connector 66 then is a shorting stub which reduces the resistance 36 to the value of portion 36–2. This serves to shift the reference voltage $V_{ref}$ to a lower level so as to provide a proper threshold for an 800 millivolts input signal swing.

The input signals A, B and C are derived from external circuits and have a logic signal swing of 800 millivolts. On the other hand, the output signals $\bar{Q}_P$, (or $Q_P$) $\bar{Q}$ and Q have signal swings of 600 millivolts.

Figure 10:
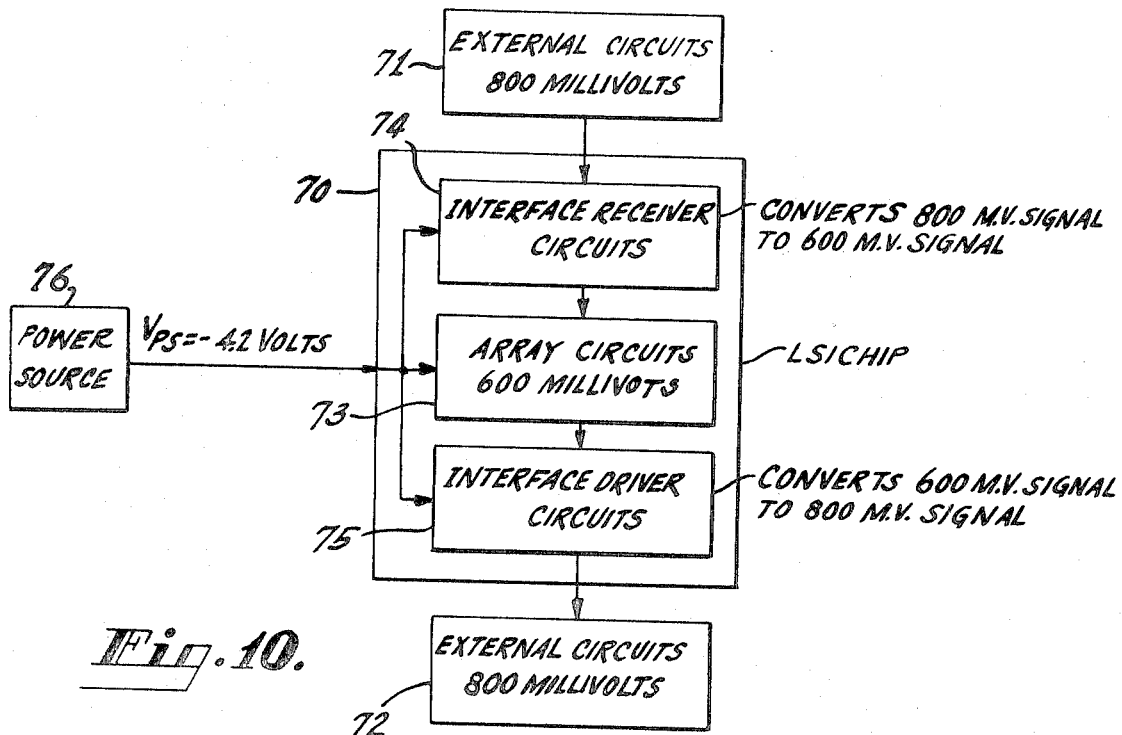
FIG. 10 is a block diagram illustrating the dual logic swing aspects of the invention.

In order to more clearly point out the system use of the present invention, reference is now made to the block diagram in FIG. 10. The block 70 is an LSI chip which contains, for example, an array of standard cells of the type illustrated in FIG. 1; the blocks 71 and 72 contain external circuits which, in the case of block 71, provide 800 millivolts input signals to the chip and in the case of the block 72 receive 800 millivolts output signals from the chip 70.

The standard cells in the LSI chip 70 are given the identities designated in the blocks 73, 74 and 75. In the block 73, the standard cells are given array circuit identities of the type wherein the input and output signal swings are 600 millivolts. These cell identities, for example, could be any of the array circuits illustrated in FIGS. 2 through 6. The cell identities in block 74 are Interface Receiver Circuits which convert the incoming 800 millivolts signals to 600 millivolts output signals which are applied to the array circuits block 73. The Interface Receiver Cell identities, for example, could be the Interface Receiver and Array Driver Gate illustrated in FIG. 9, wherein a portion of the resistor 36 is shorted by the stub 66.

The Interface Driver Circuits block 75 receives 600 millivolts signals from the array circuits 73 and converts them to 800 millivolts output signals for application to the external circuits block 72. The Interface Driver Circuits, for example, could be of the type illustrated in FIGS. 7 and 8 wherein a portion of the emitter-resistor 30 is shorted by the stub 65.

A power source 76 is illustrated as supplying a voltage of —4.2 volts to the LSI chip 70 wherein the —4.2 volts supply is distributed to each of the Array Circuits 73, Interface Receiver Circuits 74 and Interface Driver Circuits 75. That is, only one power supply voltage need be distributed to all of the standard cells on the chip 70 even though the interface circuits 74 and 75 provide signal swing conversions.

I claim:

1. A large-scale integrated circuit array of cells sharing a common substrate, each cell comprising:
   first, second, third and fourth transistors, each having base, collector and emitter regions;
   first, second and third resistors;
   first, second, third, fourth and fifth committed connection points, the first committed connection point being electrically common to the collector region of the first transistor and one end of the first resistor, the second committed connection point being electrically common to the collector region of the second transistor and one end of the second resistor, the third committed connection point being electrically common to the other ends of the first and second resistors and the collector region of the third transistor, the fourth committed connection point being electrically common to the emitter region of the first and second transistors and one end of the third resistor, and the fifth committed connection point being electrically connected to the other end of the third resistor; and
   a plurality of uncommitted connection points at said common substrate for the electrical interconnection therebetween of conductors, the various patterns chosen for such electrical interconnection determining the function performed by the cell, a different one of said uncommitted connection points being connected to the following circuit points: said first, second and fourth committed connection points, the base region of each transistor, the emitter region of the third transistor, the emitter region of the fourth transistor and the collector region of the fourth transistor.

2. The invention according to claim 1, further including the following elements, which elements also share said common substrate;
   fifth and sixth transistors each with base, collector and emitter regions;
   fourth, fifth, sixth and seventh resistors;
   sixth and seventh committed connection points;
   said collector region of said fifth transistor being electrically common with said third committed connection point; one of the collector and emitter regions of the sixth transistor being electrically common with said fifth committed connection point, and the other one of the collector and emitter regions of said sixth transistor being electrically common to one end of each of the fourth and fifth resistors and to said sixth committed connection; the other end of the fifth resistor, the one end of the sixth resistor and the base region of the second transistor being electrically common with the seventh committed connection point; the base region of the sixth transistor being unconditionally connected to one of the fifth and sixth committed connection points; and
   the other ends of the fourth and sixth resistors, both ends of the seventh resistor and the base and emitter regions of the fifth transistor, respectively, being connected to separate, additional, uncommitted connection points.

3. The invention according to claim 2, further including two additional uncommitted connection points, one connected to an intermediate point of the third resistor and the other connected to an intermediate point of the fifth resistor.

4. The invention according to claim 3, wherein:
   a seventh transistor having base, collector and emitter regions is provided,
   eighth and ninth committed connection points are provided;
   said eighth committed connection point is shared by the collector regions of the fourth transistor and the seventh transistor, the ninth committed connection point being shared by the emitter regions of the fourth and seventh transistors; and still another uncommitted connection point is provided for the base region of the seventh transistor.

5. The invention according to claim 4, further including one uncommitted connection point connected to said third connection point and one uncommitted connection point connected to said eighth committed connection point.

6. The combination as claimed in claim 3, and further including:
a conductor connected between the uncommitted connection point associated with the intermediate point of said third resistor and one of said fourth and fifth committed connection points, whereby signal levels generated at said first and second committed connection points in response to signals applied at the base of said first and second transistors are increased in amplitude.

7. The invention according to claim 6, wherein all of the transistors are of the same conductivity type.

8. The combination as claimed in claim 3, further including:
conductive means connected between the uncommitted connection point associated with the intermediate point of said fifth resistor and one of said sixth committed point and base of the second transistors, whereby a reference voltage applied to the base of said second transistor may be varied to enable the cells to interface with signals of different levels applied between the base and emitter of said first transistor.

9. The combination as claimed in claim 3, further including:
negligible impedance means selectively connecting the uncommitted connection point associated with the intermediate point of said third resistor to one of the two ends of said third resistor and for selectively connecting the uncommitted connection point associated with the intermediate point of said fifth resistor to one of the two ends of said fifth resistor whereby part of each resistor may be shorted.

10. The combination as claimed in claim 2, wherein:
said first and second transistors of each cell comprise a current mode switching pair:
the fourth transistor of each cell is an input emitter follower whose emitter is adapted to be connected to one of said base and emitter of said first transistor;
the third transistor of each cell is an output emitter follower; and further providing
means for increasing the permissible number of connections to selected ones of the current mode switching pairs comprising connections from the output emitters of selected ones of the emitter followers to the emitters of selected ones of the input emitter followers, whereby said output emitter followers so connected provide a dual function as an output transistor for one cell and as an input transistor to another cell.

11. The combination as claimed in claim 2, further including:
means connecting the base and emitter of said fifth transistor to said first committed connection point and to one end of the seventh resistor respectively, the base and emitter of said third transistor to said second committed connection point and to the other end of the sixth resistor respectively, the collector and emitter of the fourth transistor to said third committed connection point and to the base of said first transistor respectively;
means for applying an operating potential across said third and fifth committed connection points; and
means for applying set and reset signals to the bases of said first and second transistors whereby said cell operates as a set-reset flip-flop.